US 7,907,600 B2

(12) United States Patent
Babbar et al.

(10) Patent No.: US 7,907,600 B2
(45) Date of Patent: Mar. 15, 2011

(54) SYSTEM AND METHOD FOR OPTIMIZING ROBUST HEADER COMPRESSION (ROHC) IN HIGH DELAY VARIANCE ENVIRONMENT

(75) Inventors: Uppinder Singh Babbar, San Diego, CA (US); Rohit Kapoor, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 981 days.

(21) Appl. No.: 11/445,378

(22) Filed: May 31, 2006

(65) Prior Publication Data

US 2007/0147366 A1 Jun. 28, 2007

Related U.S. Application Data

(60) Provisional application No. 60/753,776, filed on Dec. 23, 2005.

(51) Int. Cl.
*H04L 1/14* (2006.01)
(52) U.S. Cl. .......................... 370/352; 370/503
(58) Field of Classification Search .................. 370/252, 370/503, 516, 517, 519, 235, 236, 428, 429, 370/518
See application file for complete search history.

(56) References Cited

U.S. PATENT DOCUMENTS

| | | | |
|---|---|---|---|
| 6,212,206 B1 | 4/2001 | Ketcham | |
| 6,300,887 B1 * | 10/2001 | Le | 341/60 |
| 6,680,955 B1 * | 1/2004 | Le | 370/477 |
| 6,845,105 B1 * | 1/2005 | Olsson et al. | 370/469 |
| 6,909,702 B2 * | 6/2005 | Leung et al. | 370/278 |
| 7,263,109 B2 | 8/2007 | Ternovsky | |
| 7,313,152 B2 * | 12/2007 | Westphal | 370/468 |
| 7,564,381 B1 * | 7/2009 | Asawa et al. | 341/106 |
| 7,644,186 B2 * | 1/2010 | Hata et al. | 709/247 |
| 7,738,391 B2 * | 6/2010 | Melpignano et al. | 370/252 |

(Continued)

FOREIGN PATENT DOCUMENTS

WO 0167709 9/2001

OTHER PUBLICATIONS

Bormann et al; "Robust Header Compression: Framework and four profiles: RTP, UDP, ESP, and Uncompressed: rfc3095, txt" IEFT, CH, Jul. 2001, XP015008878.

(Continued)

*Primary Examiner* — Chi H. Pham
*Assistant Examiner* — Kevin Mew
(74) *Attorney, Agent, or Firm* — Kristine U. Ekwueme; Kenneth K. Vu

(57) ABSTRACT

A system and method for optimizing robust header compression between a compressor (residing at AN/AT) and a decompressor (residing at AT/AN), the method comprising initializing the compressor with an estimated jitter value before the compressor; notifying the decompressor of the estimated jitter value before the compressor; estimating various threshold limits at the decompressor based on the sum of the jitter between the compressor and the decompressor (JITTER_CD) and that before the compressor (JITTER_BC); the decompressor sending a JITTER option whenever the threshold limits are exceeded; and the compressor adjusting a packet size in response the received JITTER option. The estimated jitter value before the compressor may be based on simulations or channel characteristics. Notification to the decompressor of the jitter value before the compressor may be achieved by signaling or hard-coding a same value at the compressor and the decompressor.

50 Claims, 6 Drawing Sheets

U.S. PATENT DOCUMENTS

| | | | |
|---|---|---|---|
| 2002/0018010 A1* | 2/2002 | Le | 341/60 |
| 2002/0097701 A1* | 7/2002 | Lupien et al. | 370/338 |
| 2003/0086378 A1* | 5/2003 | Chen et al. | 370/252 |
| 2003/0169755 A1* | 9/2003 | Ternovsky | 370/412 |
| 2004/0071084 A1* | 4/2004 | El-Hennawey et al. | 370/230 |
| 2004/0100913 A1* | 5/2004 | Kalliokulju et al. | 370/252 |
| 2005/0195750 A1* | 9/2005 | Le et al. | 370/252 |
| 2007/0025264 A1* | 2/2007 | Cheng et al. | 370/252 |

OTHER PUBLICATIONS

International Search Report- PCT/US06/062127, International Search Authority-European Patent Office-Feb. 18, 2008.

Taiwan Search Report - 095148635, International Search Authority - Taiwan Patent Office - Feb. 21, 2010.

Written Opinion - PCT/US06/062127, International Search Authority, European Patent Office, Feb. 18, 2008.

* cited by examiner

SYSTEM AND METHOD FOR OPTIMIZING ROBUST HEADER COMPRESSION (ROHC) IN HIGH DELAY VARIANCE ENVIRONMENT

CLAIM OF PRIORITY UNDER 35 U.S.C. §119

The present Application for Patent claims priority to Provisional Application No. 60/753,776 entitled "System And Method For Optimizing Robust Header Compression In High Delay Variance Environment," filed Dec. 23, 2005, which is assigned to the assignee hereof and is fully incorporated herein by reference.

BACKGROUND

1. Field

The present invention generally relates to data compression and decompression in a communication system and, in particular, to a system and method for optimizing Robust Header Compression (ROHC) in a high delay variance environment.

2. Background

ROHC is an Internet Engineering Task Force (IETF) header compression framework that provides for high efficiency and robustness in wireless communication systems. Among other features, ROHC supports Real-time Transfer Protocol/User Datagram Protocol/Internet Protocol (RTP/UDP/IP) and UDP/IP compression profiles. The ROHC working group is also specifying support for a Transmission Control Protocol/Internet Protocol (TCP/IP) compression profile.

ROHC exhibits robustness, i.e., the ability to tolerate errors on the wireless links. ROHC is useable with multi-media applications and provides for header compression for various applications and protocols. Header compression is a technique to reduce the header size transmitted over a link thereby increasing the link efficiency and throughput. Header compression is particularly useful on slow links or when packet sizes are small where a reduction in the header size results in a significant decrease in the header overhead. Header compression achieves this by leveraging header field redundancies in packets belonging to the same flow. In particular, many packet header fields such as IP source and destination addresses remain constant throughout the duration of a flow while other fields such as sequence numbers change predictably to allow header compression to transmit only a few bytes of header information per packet.

FIG. 1 illustrates a typical ROHC compression/decompression block diagram 100 of IP/UDP/RTP headers over a communication link. Typically, reference copies of the full headers are stored at a ROHC compressor 102 and a ROHC decompressor 104 in order to reliably communicate and reconstruct original packet headers. RFC 3095, available at URL www.faqs.org/rfcs/rfc3095.html, which is fully incorporated herein by reference, allows the ROHC decompressor to notify the compressor about jitter (delay variance) seen by a received packet on the link between the compressor-decompressor (comp-decomp) using a JITTER option sent with a FEEDBACK packet. Subsequently, the JITTER option may be used by the compressor to estimate the number of bits required to compress the RTP Timestamp (RTP TS) field when using a timer-based compression method. It is appreciated, however, that sending the JITTER option for every packet may introduce a significant overhead on the feedback channel and its use should be optimized. Accordingly, there is a need in the art for a system and method for optimizing ROHC in a high delay variance environment.

SUMMARY

The invention relates to a system and method for optimizing Robust Header Compression (ROHC) between a compressor (which may reside at an access network (AN)) and a decompressor (which may reside at an Access Terminal (AT)), the method comprising initializing the compressor with an estimated jitter value before the compressor; notifying the decompressor of the estimated jitter value before the compressor, referred to as JITTER_BC; estimating various threshold limits at the decompressor based on the jitter before the compressor (JITTER_BC); the decompressor sending the JITTER option whenever the threshold limits have been exceeded or fallen below; and the compressor adjusting a packet size in response to the received JITTER option. The estimated value of JITTER_BC may be based on simulations or channel characteristics. Notification of the value of JITTER_BC to the decompressor may be achieved by signaling or by hard-coding a same value at the compressor and the decompressor. The invention allows the estimation of jitter with sparse use of the feedback channel, and optimizes use of the feedback channel while allowing for maximum compression efficiency at any given instance.

In another aspect, the invention relates to a method for optimizing robust header compression between an access network having a compressor and an access terminal having a decompressor, comprising setting an initial JITTER_BC value representing jitter before the compressor to be a same value between the compressor at the access network and the decompressor at the access terminal; sending compressed TS fields from the compressor at the access network to the decompressor at the access terminal based on the initial JITTER_BC value; and sending a JITTER option from the decompressor of the access terminal to the compressor at the access network when the jitter value on the comp-decomp link exceeds/falls below a threshold value. The method may further comprise estimating a plurality of threshold limits based on jitter before the compressor (JITTER_BC), and the setting of the initial JITTER_BC value may comprise signaling or hard-coding the same value at the compressor and the decompressor.

It is appreciated that in the above aspects, the compressor may be at the access terminal (or any other Internet Protocol based communication device) and the decompressor may be at the access network (or any other Internet Protocol based communication device) and the system and method for optimizing ROHC in high delay variance environment would still work.

DETAILED DESCRIPTION

The word "exemplary" is used herein to mean "serving as an example, instance, or illustration." Any embodiment described herein as "exemplary" is not necessarily to be construed as preferred or advantageous over other embodiments.

A High Data Rate (HDR) subscriber station, referred to herein as Access Terminal (AT), may be mobile or stationary, and may communicate with one or more HDR base stations, referred to herein as Modem Pool Transceivers (MPTs). An access terminal transmits and receives data packets through one or more modem pool transceivers to an HDR base station controller, referred to herein as a Modem Pool Controller (MPC). Modem pool transceivers and modem pool controllers are parts of a network called an Access Network (AN). An access network transports data packets between multiple access terminals. The access network may be further connected to additional networks outside the access network, such as a corporate intranet or the Internet, and may transport data packets between each access terminal and such outside networks. An access terminal that has established an active traffic channel connection with one or more modem pool transceivers is called an active access terminal, and is said to be in a traffic state. An access terminal that is in the process of establishing an active traffic channel connection with one or more modem pool transceivers is said to be in a connection setup state. An access terminal may be any data device that communicates through a wireless channel or through a wired channel, for example, using fiber optic or coaxial cables. An access terminal may further be any of a number of types of devices including but not limited to PC card, compact flash, external or internal modem, or wireless or wireline phone. The communication link through which the access terminal sends signals to the modem pool transceiver is called a reverse link. The communication link through which a modem pool transceiver sends signals to an access terminal is called a forward link.

The communication system as described in the invention may use one or more communication techniques, such as Code Division Multiple Access (CDMA), IS-95, High Data Rate (HDR), as specified in "CDMA2000 High Rate Packet Data Air Interface Specification," TIA/EIA/IS-856, CDMA 1× Evolution Data Optimized (EV-DO), 1×EV-DV, Wideband CMDA (WCDMA), Universal Mobile Telecommunications System (UMTS), Time Division Synchronous CDMA (TD-SCMA), Orthogonal Frequency Division Multiplexing (OFDM), etc. The examples described below are applicable to other systems as well, and the present examples are not meant to limit the present application.

Figure 1:
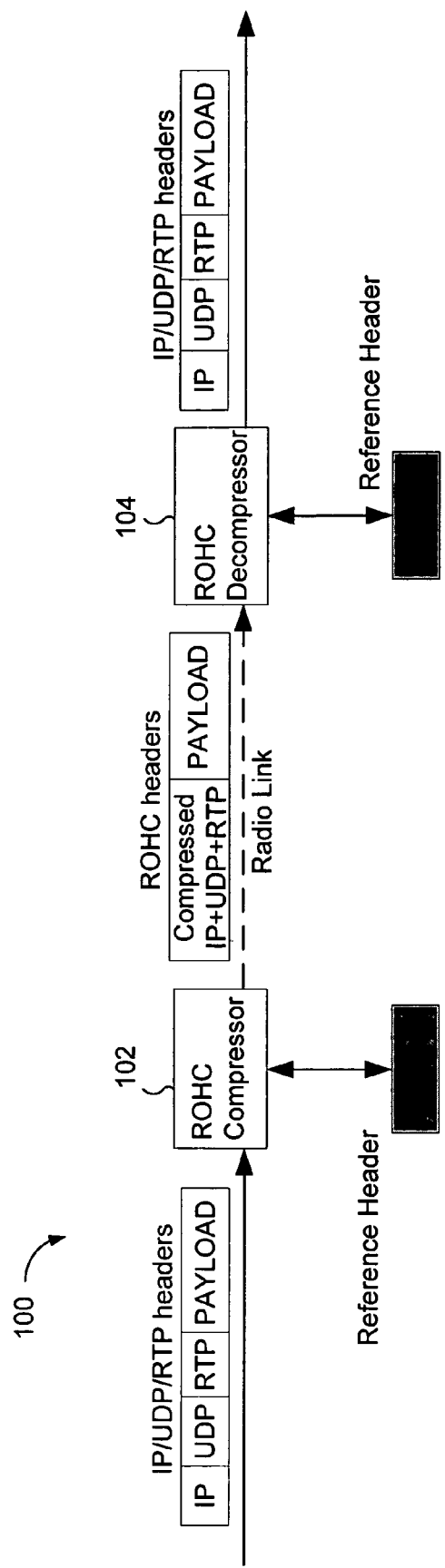
FIG. 1 illustrates a block diagram of a typical robust header compressor/decompressor in a communication system.
Figure 2:
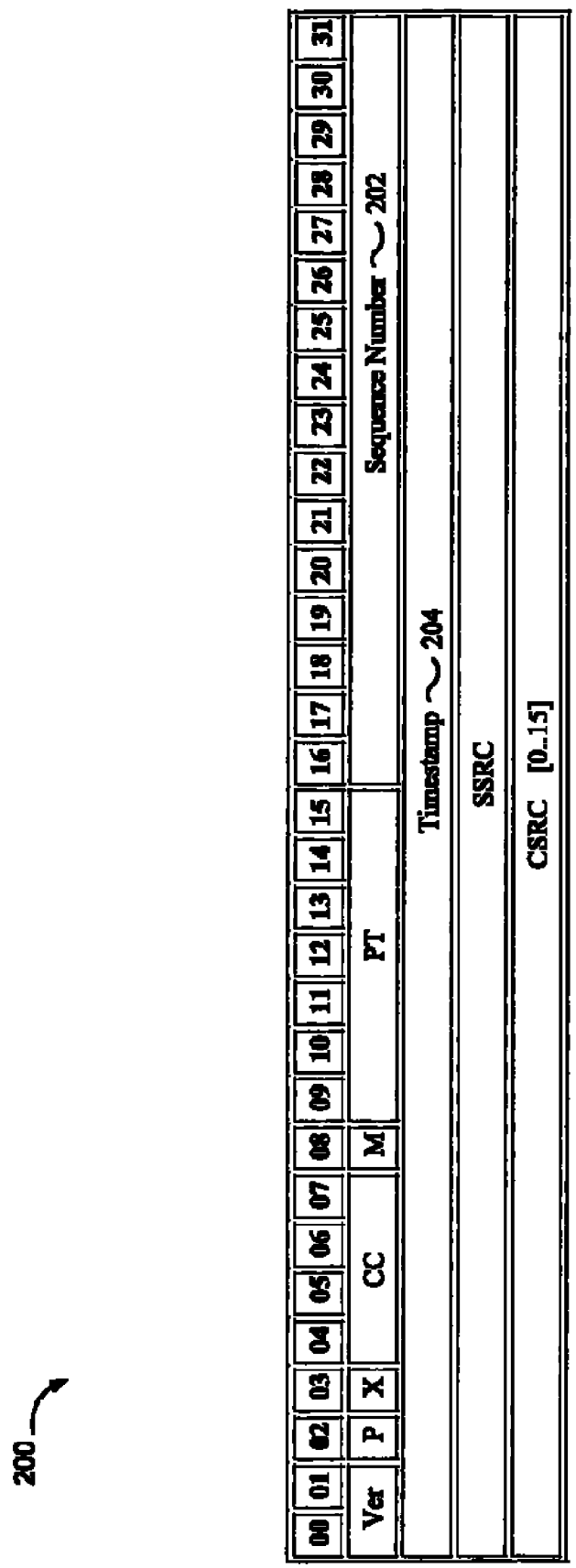
FIG. 2 illustrates an RTP header.

As explained above, ROHC is a header compression scheme that compresses RTP/UDP/IP headers efficiently. Referring to FIG. 2, there is shown an RTP header 200. One of the techniques ROHC uses to compress headers is to compress an RTP Sequence Number (RTP SN) field 202 and then use linear relations from the RTP SN field 202 to other fields such as an RTP Timestamp (RTP TS) field 204. The RTP SN field 202 increases by one (1) for every transmitted packet, while the RTP TS field 204 increments according to a sampling rate. ROHC is also designed to be a flexible header compression framework capable of supporting several protocol stacks. That is, general packet formats, compressor and decompressor finite state machines, modes of operation, error recovery and correction mechanisms, and encoding methods are defined at the framework level. The encoding methods for dynamic fields in the packet headers are selected based on the dynamic pattern of a specific field.

According to RFC 3095, the ROHC decompressor is allowed to notify the ROHC compressor about the jitter (delay variance) seen by a received packet on the link between the compressor-decompressor (comp-decomp) using the JITTER option. The JITTER option may be used by the ROHC compressor to estimate the number of bits required to compress RTP TS when using the timer-based compression method. As stated above, sending the JITTER option for every packet may introduce a significant overhead on the feedback channel and, as such, its use should be optimized. Stated another way, significant use of the feedback channel may cause loss in system capacity and thus its use should be optimized. The total jitter, which is the sum of the jitter between the compressor-decompressor (called JITTER_CD) and that before the compressor (called JITTER_BC), determines how many bits, e.g., k bits, are required to compress the RTP TS field. Depending upon the number of bits required, the compressor uses an appropriate packet format to transmit the compressed packet to the decompressor such that the packet format contains at least the required number of bits for representing the compressed RTP TS field.

Once the jitter increases beyond a certain threshold, however, a larger k bits may be needed to transmit the compressed RTP TS field and hence a different packet format may be needed to fit the k bits. In other words, the k bits are used to encode the TS field and are transmitted to the decompressor, which derives the original value using a known reference value. Correctness is guaranteed if the compressor's set of reference values contains the reference value being used by the decompressor and the transmitted k bits are large enough to capture the total jitter (which is the sum of JITTER_BC and JITTER_CD).

It is appreciated that as the value of k gets larger, the compression efficiency may decrease since the packet format supporting the larger k may itself be larger in size. For example, for jitter <270 ms, an IPv4 packet may be compressed using UO-1-TS packet format in the second order (SO) state. For jitter >270 ms, a UOR-2-TS or larger packets may need to be used which reduces the compression efficiency. Hence, it is important for the compressor to have accurate estimates of the jitter before the compressor as well as between the compressor and decompressor during certain transition periods.

Figure 3A:
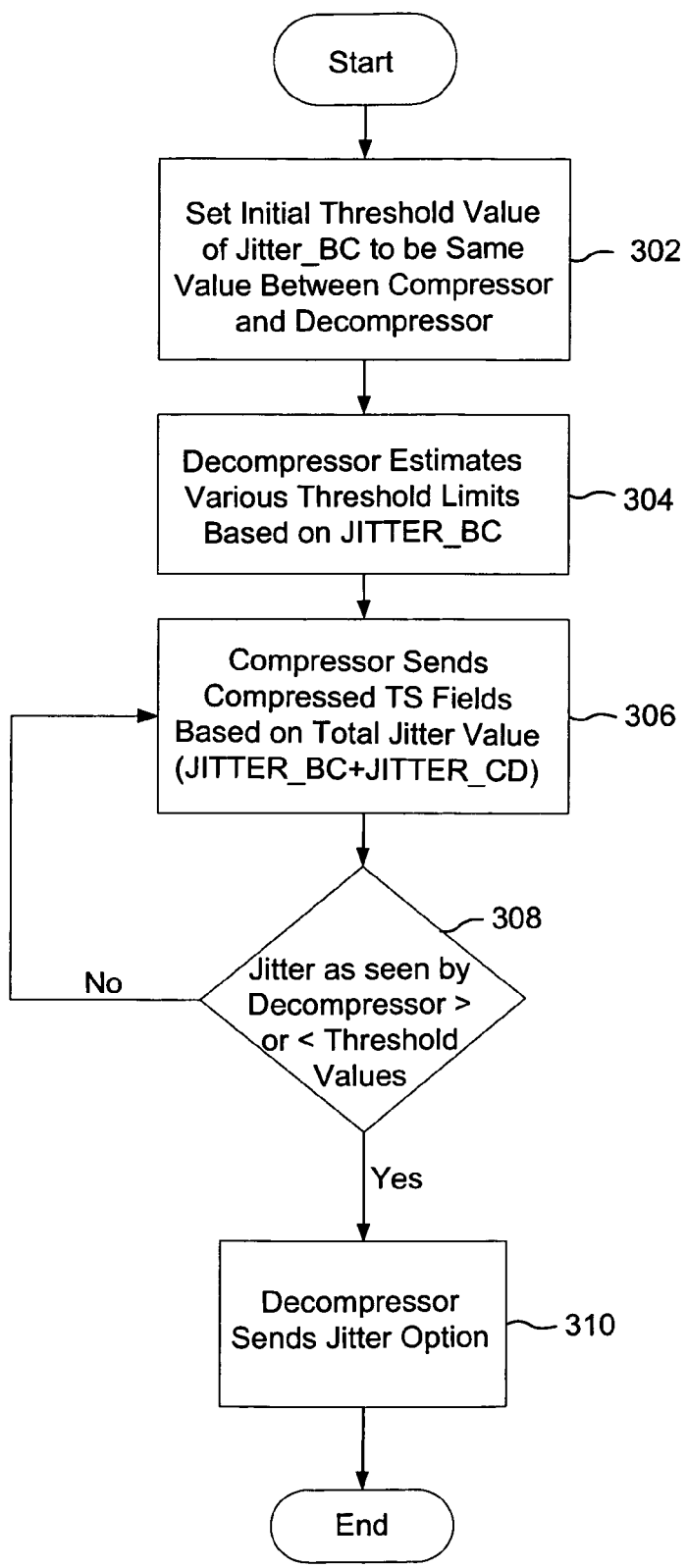
FIG. 3(a) is a flowchart illustrating the operations of the optimized ROHC.
Figure 3B:
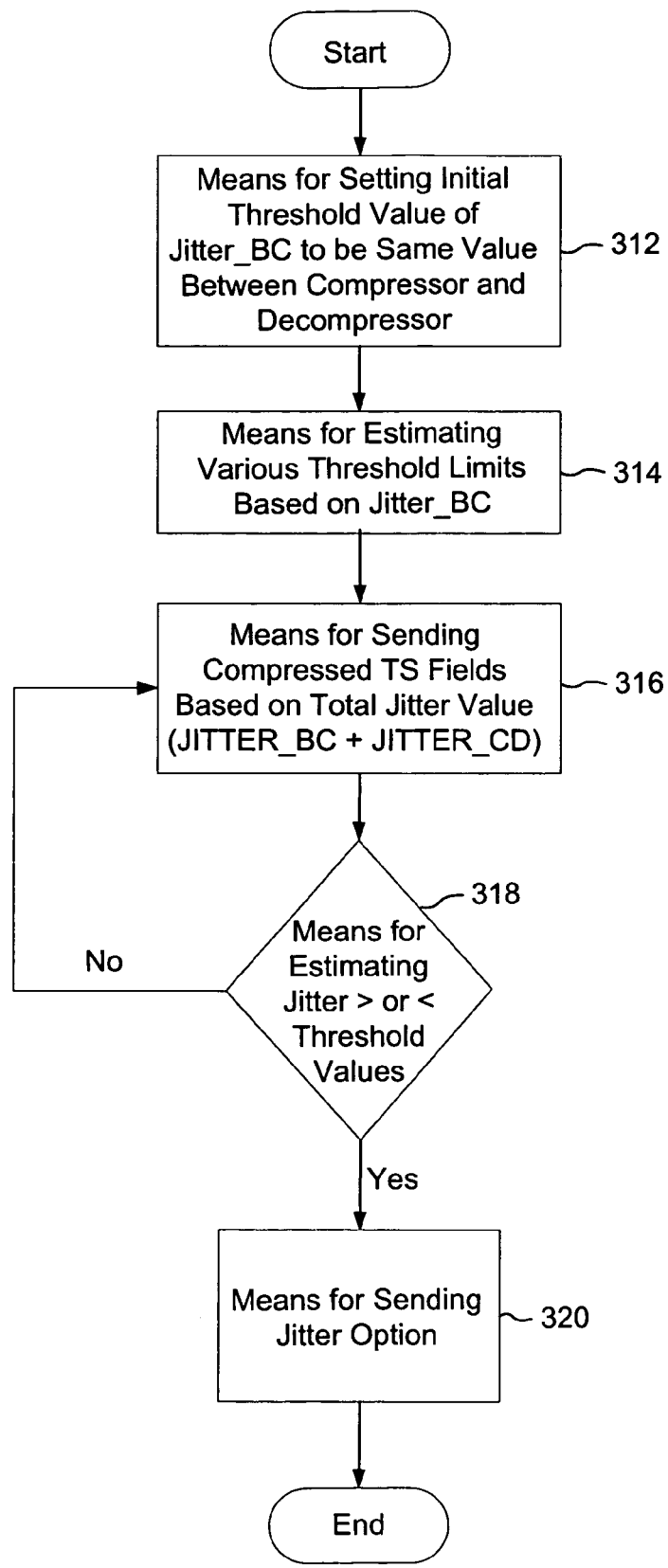
FIG. 3(b) illustrates an apparatus to perform the method of FIG. 3(a)

Given the above, an aspect of the invention is to use the JITTER option sparingly. Referring to FIG. 3(a), there is shown a general flowchart illustrating the operations of the invention. In block 302, an initial value of JITTER_BC is set to the same value at the compressor and the decompressor at the AN and the AT, respectively. This may be achieved, for example, by signaling from the AN to the AT or hard-coding the same value at the AN and the AT. Next, in block 304, the decompressor estimates various threshold limits based on the initial JITTER_BC value. These limits are defined as the values which require a change in packet format in order to correctly decompress the packet, and may be calculated as the difference between the jitter values which require a change in packet format and the value of JITTER_BC. In block 306, the compressor sends to the decompressor compressed RTP TS fields based on the sum of JITTER_CD and JITTER_BC. In block 308, the decompressor determines whether the estimated jitter between the compressor and the decompressor, i.e., JITTER_CD exceeds/falls below the threshold value(s). Finally, in block 310, the decompressor sparingly sends to the compressor the JITTER option, i.e., the decompressor only sends the JITTER option when the estimated JITTER_CD exceeds/falls below the threshold value(s). This allows the estimation of jitter with sparse use of feedback. As a result, the invention ensures the optimum use of the feedback channel while allowing for maximum compression efficiency at any given instance. FIG. 3(b) illustrates an apparatus comprising means 312-320 to perform the method of FIG. 3(a). The means 312-320 in FIG. 3(b) may be implemented in hardware, software or a combination of hardware and software. It is appreciated that the compressor may be at the AT and the decompressor may be at the AN and the system and method for optimizing ROHC in high delay variance environment would still work.

Figure 4A:
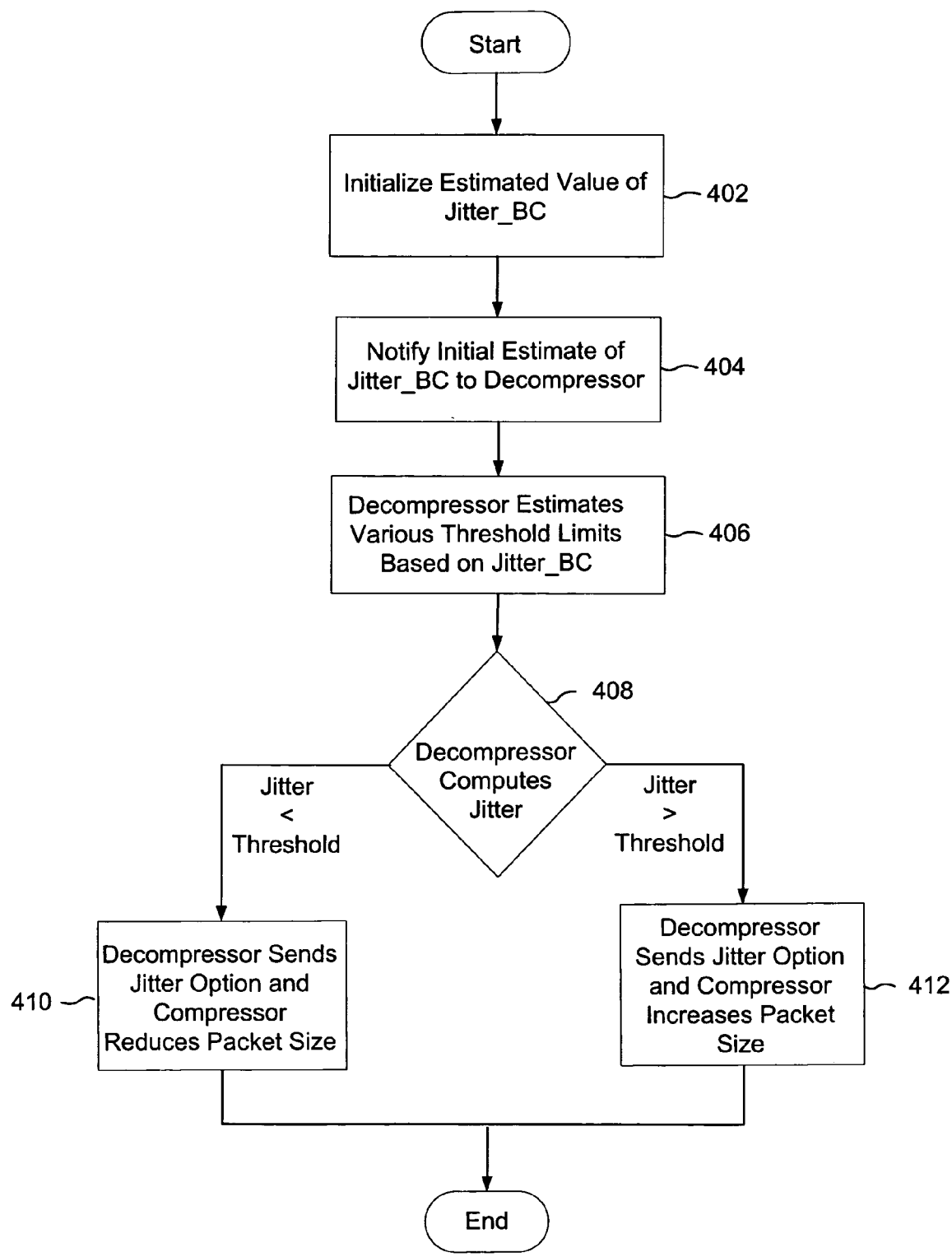
FIG. 4(a) is a flowchart illustrating the operations of the optimized ROHC in another aspect.
Figure 4B:
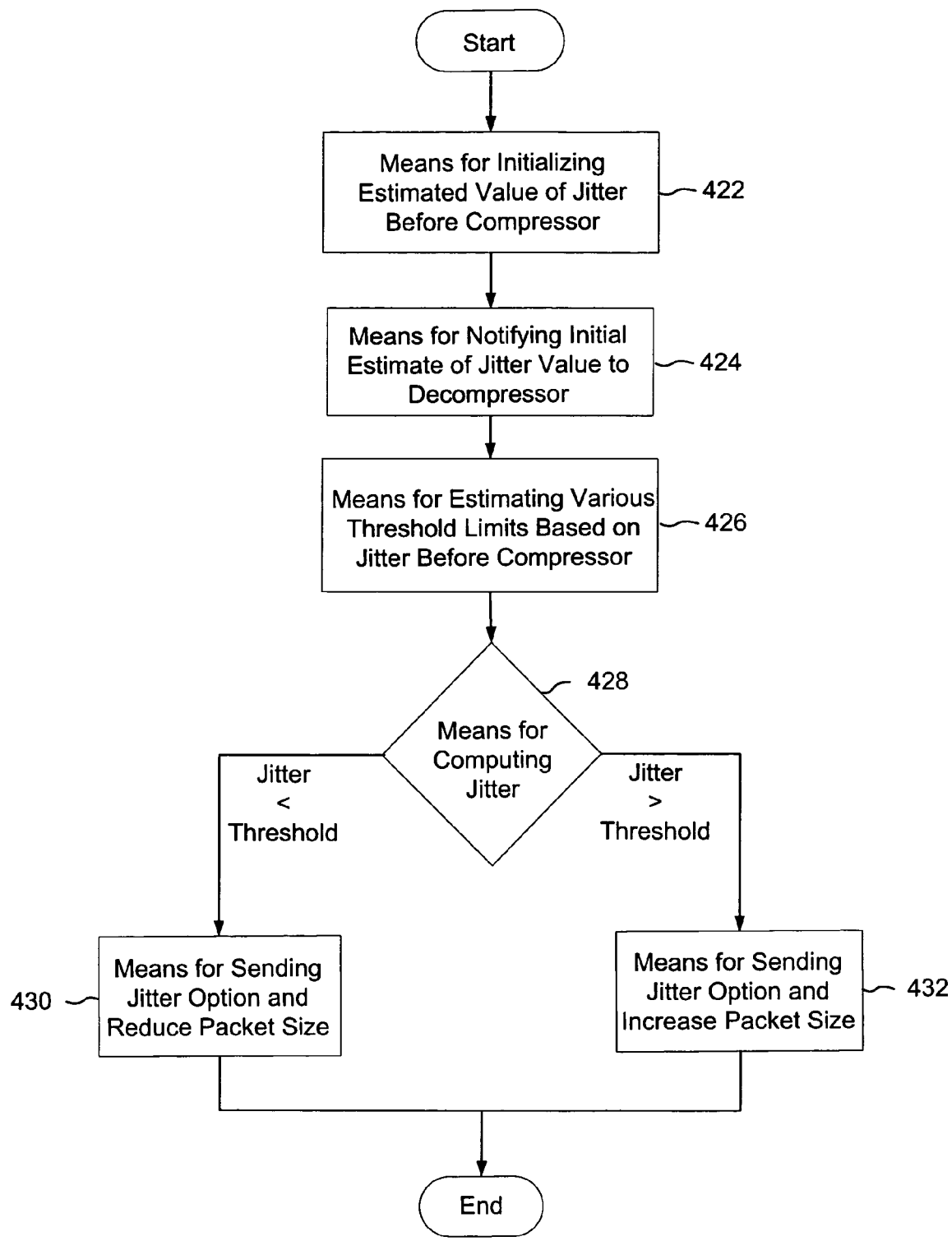
FIG. 4(b) illustrates an apparatus to perform the method of FIG. 4(a).

Referring to FIG. 4(a), there is shown a flowchart in accordance with another aspect of the invention to minimize the JITTER feedback overhead and to maximize compression efficiency. In block 402, the AN initializes the compressor with an estimated value of jitter before the compressor (JITTER_BC). The initialization may be based on simulations or channel characteristics. In block 404, the decompressor is notified about the initial estimate of JITTER_BC. This may be achieved either through some signaling (using the lower layers, as an example) or by hard-coding the same value at the compressor and the decompressor. In block 406, the decompressor estimates the various threshold limits for jitter between the compressor and the decompressor based on the jitter before the compressor-decompressor link, i.e., the JITTER_BC. These limits are defined as the values which require a change in packet format in order to correctly decompress the packet, and may be calculated as the difference between the jitter values which require a change in packet format and the value of JITTER_BC. In block 408, the decompressor computes the jitter between compressor and decompressor (JITTER_CD) with every packet (or periodically to reduce computing overhead, for example, every 10 packets) received and if it detects a change in computed JITTER_CD above or below a threshold, then the decompressor sends the JITTER feedback option to the peer compressor in order to allow the compressor to use a different format packet. If the JITTER_CD has fallen below a lower threshold as shown in block 410, then the compressor will reduce the packet size and increase compression efficiency. Otherwise, if the JITTER_CD has risen above a threshold as shown in block 412, then the compressor will increase the packet size and decrease compression efficiency. FIG. 4(b) illustrates an apparatus comprising means 420-432 to perform the method of FIG. 4(a). The means 422-432 in FIG. 4(b) may be implemented in hardware, software or a combination of hardware and software. It is appreciated that the compressor may be at the AT and the decompressor may be at the AN and the system and method for optimizing ROHC in high delay variance environment would still work.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for optimizing Robust Header Compression (ROHC) between an Access Network (AN) having a compressor and an Access Terminal (AT) having a decompressor, comprising:

setting an initial value of jitter to be an identical value at the compressor at the AN and the decompressor at the AT, wherein the initial value of jitter is selected as the value of jitter before the compressor at the AN;

receiving compressed TS fields from the AN to the AT, wherein the compression used is based on the initial jitter value;

determining if the received jitter value exceeds or falls below a threshold value based on the initial jitter value; and upon a determination that the received jitter value exceeds or falls below the threshold value, sending a JITTER option from the decompressor of the AT to the AN, wherein the JITTER option prompts the AN to modify the compression used to compress the TS fields.

2. The method of claim 1, further comprising estimating a plurality of threshold limits based on the value of the jitter before the compressor.

3. The method of claim 1, wherein the setting of the initial value of jitter before the compressor comprises signaling or hard-coding the same value at the compressor and the decompressor.

4. A system providing optimized Robust Header Compression (ROHC) between an Access Network (AN) having a compressor and an Access Terminal (AT) having a decompressor, comprising:
   means for setting an initial value of jitter to be an identical value at the compressor at the AN and the decompressor at the AT, wherein the initial value of jitter is selected as the value of jitter before the compressor at the AN;
   means for receiving compressed TS fields from the AN to the AT, wherein the compression used is based on the initial jitter value;
   means for determining if the received jitter value exceeds or falls below a threshold value based on the initial jitter value; and
   means for sending a JITTER option from the decompressor of the AT to the AN, wherein the JITTER option prompts the AN to modify the compression used to compress the TS fields upon a determination that the received jitter value exceeds or falls below the threshold value.

5. The system of claim 4, further comprising means for estimating a plurality of threshold limits based on the value of jitter before the compressor.

6. The system of claim 4, wherein the setting means of the initial value of jitter before the compressor comprises means for signaling or means for hard-coding the same value at the compressor and the decompressor.

7. A method for optimizing Robust Header Compression (ROHC) between an Access Network (AN) having a compressor and an Access Terminal (AT) having a decompressor, comprising:
   initializing the compressor with an estimated value of jitter before the compressor;
   notifying the decompressor with the estimated jitter value;
   receiving a JITTER option when the estimated jitter value exceeds or falls below at least one of a plurality of threshold limits at the decompressor of the AT, wherein the plurality of threshold limits are based on the estimated value of jitter before the compressor; and
   adjusting a packet size at the compressor based on the JITTER option.

8. The method of claim 7, wherein the estimated jitter value is based on simulations or channel characteristics.

9. The method of claim 7, wherein the initializing the compressor with the estimated value of jitter comprises signaling or hard-coding a same value at the compressor and the decompressor.

10. The method of claim 7, wherein the receiving further comprises receiving the JITTER option when the estimated jitter value exceeds a threshold value and wherein the adjusting further comprises increasing the packet size when receiving the JITTER option.

11. The method of claim 7, wherein the receiving further comprises receiving the JITTER option when the estimated jitter value falls below a threshold value and wherein the adjusting further comprises reducing the packet size when receiving the JITTER option.

12. A system providing optimized robust header compression (ROHC) between an Access Network (AN) having a compressor and an Access Terminal (AT) having a decompressor, comprising:
   means for initializing the compressor with an estimated value of jitter before the compressor;
   means for notifying the decompressor with the estimated jitter value;
   means for receiving a JITTER option when the estimated jitter value exceeds or falls below at least one of a plurality of threshold limits at the decompressor of the AT, wherein the plurality of threshold limits are based on the estimated value of jitter before the compressor; and
   means for adjusting a packet size at the compressor based on the JITTER option.

13. The system of claim 12, wherein the estimated jitter value is based on simulations or channel characteristics.

14. The system of claim 12, wherein the initializing means comprises means for signaling or means for hard-coding a same value at the compressor and the decompressor.

15. The system of claim 12, wherein the means for receiving further comprises means for receiving the JITTER option when the estimated jitter value exceeds a threshold value and wherein the means for adjusting further comprises means for increasing the packet size when receiving the JITTER option.

16. The system of claim 12, wherein the means for receiving further comprises means for receiving the JITTER option when the estimated jitter value falls below a threshold value and wherein the means for adjusting further comprises means for reducing the packet size when receiving the JITTER option.

17. A method for optimizing Robust Header Compression (ROHC) between an Access Terminal (AT) having a compressor and an Access Network (AN) having a decompressor, comprising:
   setting an initial value of jitter to be an identical value at the compressor at the AT and the decompressor at the AN, wherein the initial value of jitter is selected as the value of jitter before the compressor at the AT;
   determining if the received jitter value exceeds or falls below a threshold value based on the initial jitter value; and
   upon a determination that the received jitter value exceeds or falls below the threshold value, sending a JITTER option from the decompressor of the AN to the AT, wherein the JITTER option prompts the AT to modify the compression used to compress the TS fields.

18. The method of claim 17, further comprising estimating a plurality of threshold limits based on the value of jitter before the compressor.

19. The method of claim 17, wherein the setting of the initial value of jitter before the compressor comprises signaling or hard-coding the same value at the compressor and the decompressor.

20. A system providing optimized Robust Header Compression (ROHC) between an Access Terminal (AT) having a compressor and an Access Network (AN) having a decompressor, comprising:
   means for setting an initial value of jitter to be an identical value at the compressor at the AT and the decompressor at the AN, wherein the initial value of jitter is selected as the value of jitter before the compressor at the AT;
   means for receiving compressed TS fields from the AT to the AN, wherein the compression used is based on the initial jitter value;
   means for determining if the received jitter value exceeds or falls below a threshold value based on the initial jitter value; and
   means for sending a JITTER option from the decompressor of the AN to the AT, wherein the JITTER option prompts the AT to modify the compression used to compress the TS fields upon a determination that the received jitter value exceeds or falls below the threshold value.

21. The system of claim 20, further comprising means for estimating a plurality of threshold limits based on the value of jitter before the compressor.

22. The system of claim 20, wherein the setting means of the initial value of jitter before the compressor comprises means for signaling or means for hard-coding the same value at the compressor and the decompressor.

23. A method for optimizing Robust Header Compression (ROHC) between an Access Terminal (AT) having a compressor and an Access Network (AN) having a decompressor, comprising:
   initializing the compressor with an estimated value of jitter before the compressor;
   notifying the decompressor with the estimated jitter value;
   receiving a JITTER option when the estimated jitter value exceeds or falls below at least one of a plurality of threshold limits at the decompressor of the AN, wherein the plurality of threshold limits are based on the estimated value of jitter before the compressor; and
   adjusting a packet size at the compressor based on the JITTER option.

24. The method of claim 23, wherein the estimated jitter value is based on simulations or channel characteristics.

25. The method of claim 23, wherein the initializing the compressor with the estimated value of jitter comprises signaling or hard-coding a same value at the compressor and the decompressor.

26. The method of claim 23, wherein the receiving further comprises receiving the JITTER option when the estimated jitter value exceeds a threshold value and wherein the adjusting further comprises increasing the packet size when receiving the JITTER option.

27. The method of claim 23, wherein the receiving further comprises receiving the JITTER option when the estimated jitter value falls below a threshold value and wherein the adjusting further comprises reducing the packet size when receiving the JITTER option.

28. A system providing optimized Robust Header Compression (ROHC) between an Access Terminal (AT) having a compressor and an Access Network (AN) having a decompressor, comprising:
   means for initializing the compressor with an estimated value of jitter before the compressor;
   means for notifying the decompressor with the estimated jitter value;
   means for receiving a JITTER option when the estimated jitter value exceeds or falls below at least one of a plurality of threshold limits at the decompressor of the AN, wherein the plurality of threshold limits are based on the estimated value of jitter before the compressor; and
   means for adjusting a packet size at the compressor based on the JITTER option.

29. The system of claim 28, wherein the estimated jitter value is based on simulations or channel characteristics.

30. The system of claim 28, wherein the initializing means comprises means for signaling or means for hard-coding a same value at the compressor and the decompressor.

31. The system of claim 28, wherein the means for receiving further comprises means for receiving the JITTER option when the estimated jitter value exceeds a threshold value and wherein the means for adjusting further comprises means for increasing the packet size when receiving the JITTER option.

32. The system of claim 28, wherein the means for receiving further comprises means for receiving the JITTER option when the estimated jitter value falls below a threshold value and wherein the means for adjusting further comprises means for reducing the packet size when receiving the JITTER option.

33. At least one processor configured to optimize Robust Header Compression (ROHC) between an Access Network (AN) having a compressor and an Access Terminal (AT) having a decompressor, comprising:
   a first module for setting an initial value of jitter to be an identical value at the compressor at the AN and the decompressor at the AT, wherein the initial value of jitter is selected as the value of jitter before the compressor at the AN;
   a second module for receiving compressed TS fields from the AN to the AT, wherein the compression used is based on the initial jitter value;
   a third module for determining if the received jitter value exceeds or falls below a threshold value based on the initial jitter value; and
   a fourth module for sending a JITTER option from the decompressor of the AT to the AN, wherein the JITTER option prompts the AN to modify the compression used to compress the TS fields upon a determination that the received jitter value exceeds or falls below the threshold value.

34. A computer program product, comprising:
   a non-transitory computer-readable storage medium comprising:
   a first set of instructions for causing a computer to set an initial value of jitter to be an identical value at the compressor at an access network (AN) and the decompressor at an Access Terminal (AT), wherein the initial value of jitter is selected as the value of jitter before the compressor at the AN;
   a second set of instructions for causing the computer to receive compressed TS fields from the AN to the AT, wherein the compression used is based on the initial jitter value;
   a third set of instructions for causing the computer to determine if the received jitter value exceeds or falls below a threshold value based on the initial jitter value; and
   a fourth set of instructions for causing the computer to send a JITTER option from the decompressor of the AT to the AN, wherein the JITTER option prompts the AN to modify the compression used to compress the TS fields upon a determination that the received jitter value exceeds or falls below the threshold value.

35. An access terminal (AT), comprising:
   a decompressor operable to set an initial value of jitter to be an identical value at the compressor at an (access network) AN and the decompressor at the AT, wherein the initial value of jitter is selected as the value of jitter before the compressor at the AN;
   a transceiver operable to receive compressed TS fields from the AN to the AT, wherein the compression used is based on the initial jitter value;
   wherein the decompressor is further operable to determine if the received jitter value exceeds or falls below a threshold value based on the initial jitter value; and
   wherein the transceiver is further operable to send a JITTER option from the decompressor of the AT to the AN, wherein the JITTER option prompts the AN to modify the compression used to compress the TS fields upon a determination that the received jitter value exceeds or falls below the threshold value.

36. The AT of claim 35, wherein the decompressor is further operable to estimate a plurality of threshold limits based on the value of the jitter before the compressor.

37. The AT of claim 35, wherein the transceiver is further operable to receive a signal or hard code to set the initial value of jitter to be the same value at the compressor and the decompressor.

38. At least one processor configured to optimize Robust Header Compression (ROHC) between an Access Network (AN) having a compressor and an Access Terminal (AT) having a decompressor, comprising:
 a first module for initializing the compressor with an estimated value of jitter before the compressor;
 a second module for notifying the decompressor with the estimated jitter value;
 a third module for receiving a JITTER option when the estimated jitter value exceeds or falls below at least one of a plurality of threshold limits at the decompressor of the AT, wherein the plurality of threshold limits are based on the estimated value of jitter before the compressor; and
 a fourth module for adjusting a packet size at the compressor based on the JITTER option.

39. A computer program product, comprising:
 a non-transitory computer-readable storage medium comprising: a first set of instructions for causing a computer to initialize a compressor with an estimated value of jitter before the compressor;
 a second set of instructions for causing the computer to notify a decompressor of an access terminal (AT) with the estimated jitter value;
 a third set of instructions for causing the computer to receive a JITTER option when the estimated jitter value exceeds or falls below at least one of a plurality of threshold limits at the decompressor of the AT, wherein the plurality of threshold limits are based on the estimated value of jitter before the compressor; and
 a fourth set of, instructions for causing the computer to adjust a packet size at the compressor based on the JITTER option.

40. An access network (AN), comprising:
 a compressor operable to initialize a compressor with an estimated value of jitter before the compressor;
 a transceiver operable to:
  notify a decompressor of an access terminal (AT) with the estimated jitter value; and
  receive a JITTER option when the estimated jitter value exceeds or falls below at least one of a plurality of threshold limits at the decompressor of the AT, wherein the plurality of threshold limits are based on the estimated value of jitter before the compressor; and
 wherein the compressor is further operable to adjust a packet size at the compressor based on the JITTER option.

41. At least one processor configured to optimize Robust Header Compression (ROHC) between an Access Network (AN) having a compressor and an Access Terminal (AT) having a decompressor, comprising:
 a first module for setting an initial value of jitter to be an identical value at the compressor at the AT and the decompressor at the AN, wherein the initial value of jitter is selected as the value of jitter before the compressor at the AT;
 a second module for determining if the received jitter value exceeds or falls below a threshold value based on the initial jitter value; and
 a third module for sending a JITTER option from the decompressor of the AN to the AT, wherein the JITTER option prompts the AT to modify the compression used to compress the TS fields upon a determination that the received jitter value exceeds or falls below the threshold value.

42. A computer program product, comprising:
 a non-transitory computer-readable storage medium comprising: a first set of instructions for causing a computer to set an initial value of jitter to be an identical value at a compressor at an access terminal (AT) and a decompressor at an access network (AN), wherein the initial value of jitter is selected as the value of jitter before the compressor at the AT;
 a second set of instructions for causing the computer to determine if the received jitter value exceeds or falls below a threshold value based on the initial jitter value; and
 a third set of instructions for causing the computer to send a JITTER option from the decompressor of the AN to the AT, wherein the JITTER option prompts the AT to modify the compression used to compress the TS fields upon a determination that the received jitter value exceeds or falls below the threshold value.

43. An access network (AN), comprising:
 a decompressor operable to set an initial value of jitter to be an identical value at the compressor at an access terminal (AT) and a decompressor at the AN, wherein the initial value of jitter is selected as the value of jitter before the compressor at the AT;
 wherein the decompressor is further operable to determine if the received jitter value exceeds or falls below a threshold value based on the initial jitter value; and
 wherein the transceiver is further operable to send a JITTER option from the decompressor of the AN to the AT, wherein the JITTER option prompts the AT to modify the compression used to compress the TS fields upon a determination that the received jitter value exceeds or falls below the threshold value.

44. At least one processor configured to optimize Robust Header Compression (ROHC) between an Access Terminal (AT) having a compressor and an Access Network (AN) having a decompressor, comprising:
 a first module for initializing the compressor with an estimated value of jitter before the compressor;
 a second module for notifying the decompressor with the estimated jitter value;
 a third module for receiving a JITTER option when the estimated jitter value exceeds or falls below at least one of a plurality of threshold limits at the decompressor of the AN, wherein the plurality of threshold limits are based on the estimated value of jitter before the compressor; and
 a fourth module for adjusting a packet size at the compressor based on the JITTER option.

45. A computer program product, comprising:
 a non-transitory computer-readable storage medium comprising:
 a first set of instructions for causing a computer to initialize a compressor of an Access Terminal (AT) with an estimated value of jitter before the compressor;
 a second set of instructions for causing the computer to notify a decompressor of an Access Network (An) with the estimated jitter value;
 a third set of instructions for causing the computer to receive a JITTER option when the estimated jitter value exceeds or falls below at least one of a plurality of threshold limits at the decompressor of the AN, wherein the plurality of threshold limits are based on the estimated value of jitter before the compressor; and a fourth set of instructions for causing the computer to adjust a packet size at the compressor based on the JITTER option.

46. An access terminal (AT), comprising:
   a compressor operable for initializing the compressor with an estimated value of jitter before the compressor;
   a transceiver operable for:
      notifying the decompressor with the estimated jitter value; and
      receiving a JITTER option when the estimated jitter value exceeds or falls below at least one of a plurality of threshold limits at the decompressor of the AN, wherein the plurality of threshold limits are based on the estimated value of jitter before the compressor; and
   wherein the compressor is further operable for adjusting a packet size at the compressor based on the JITTER option.

47. The AT of claim 46, wherein the estimated jitter value is based on simulations or channel characteristics.

48. The AT of claim 46, wherein the AT is further operable to signal or hard-code a same value for the estimated value of jitter at the compressor and the decompressor.

49. The AT of claim 46, wherein the transceiver is further operable to receive the JITTER option when the estimated jitter value exceeds a threshold value and wherein the adjusting further comprises increasing the packet size when receiving the JITTER option.

50. The AT of claim 46, wherein the transceiver is further operable to receive the JITTER option when the estimated jitter value falls below a threshold value and wherein the adjusting further comprises reducing the packet size when receiving the JITTER option.

* * * * *